July 15, 1941.  E. C. JONES ET AL  2,249,426
TIRE DEFLATION AND INFLATION INDICATOR
Filed June 5, 1940  4 Sheets-Sheet 1
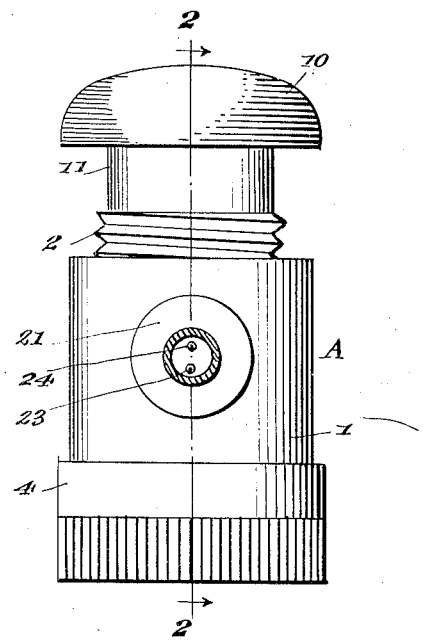
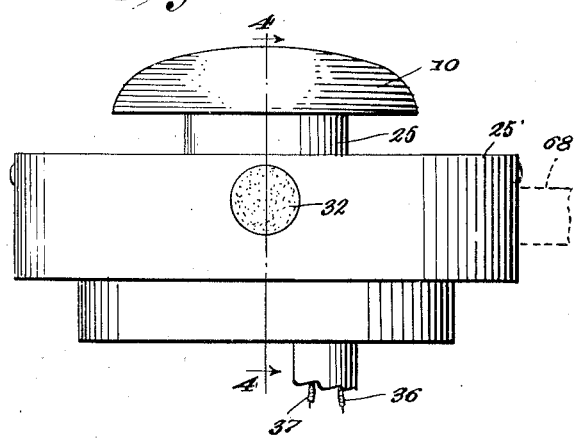
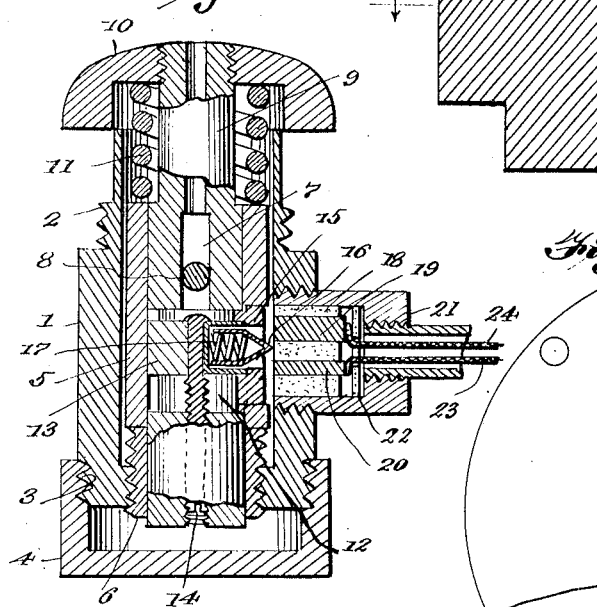
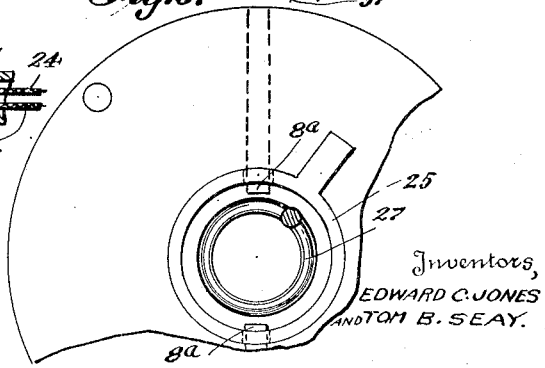
Inventors,
EDWARD C. JONES
AND TOM B. SEAY.
By E. E. Vrooman & Co.,
Attorneys.

July 15, 1941.　　E. C. JONES ET AL　　2,249,426
TIRE DEFLATION AND INFLATION INDICATOR
Filed June 5, 1940　　4 Sheets-Sheet 2
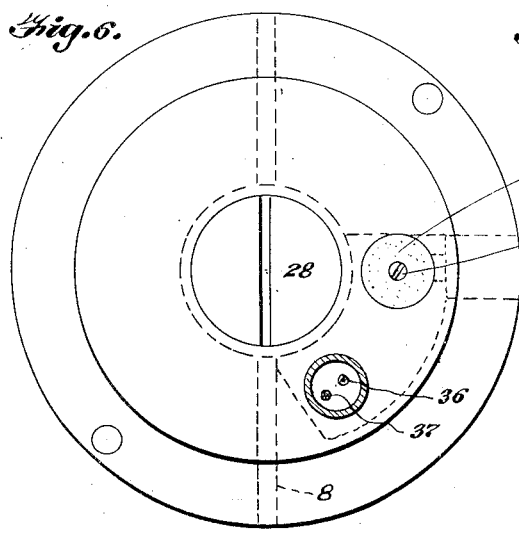
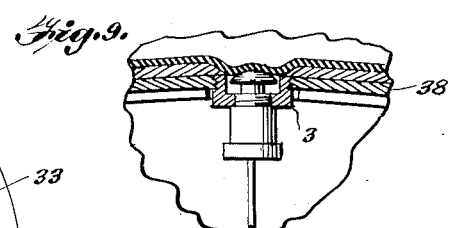
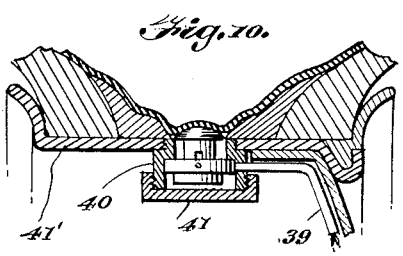
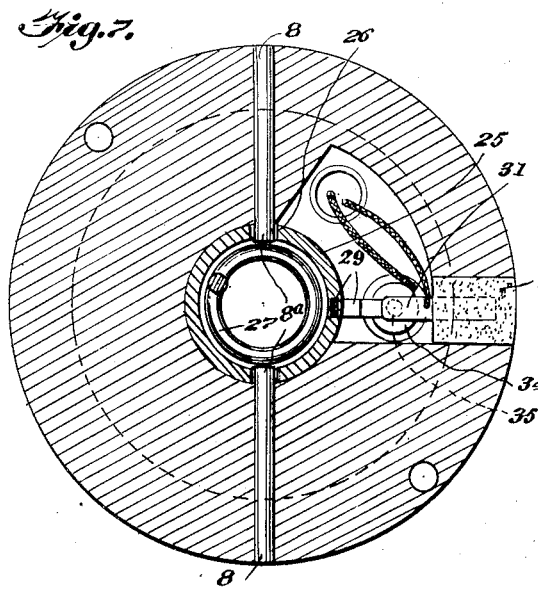
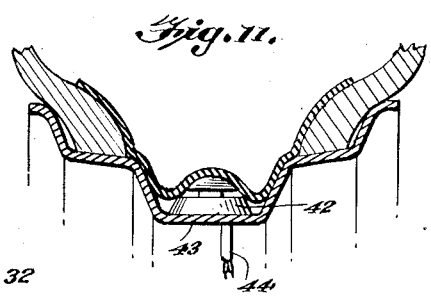
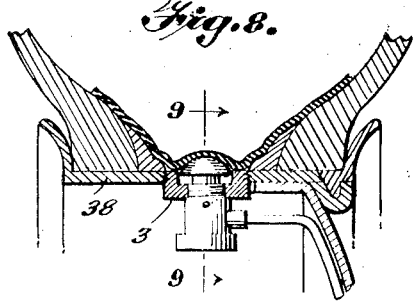
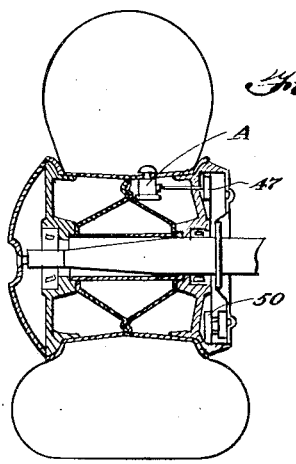
Inventors,
EDWARD C. JONES AND
TOM B. SEAY.
By E. E. Vrooman & Co.
Attorneys

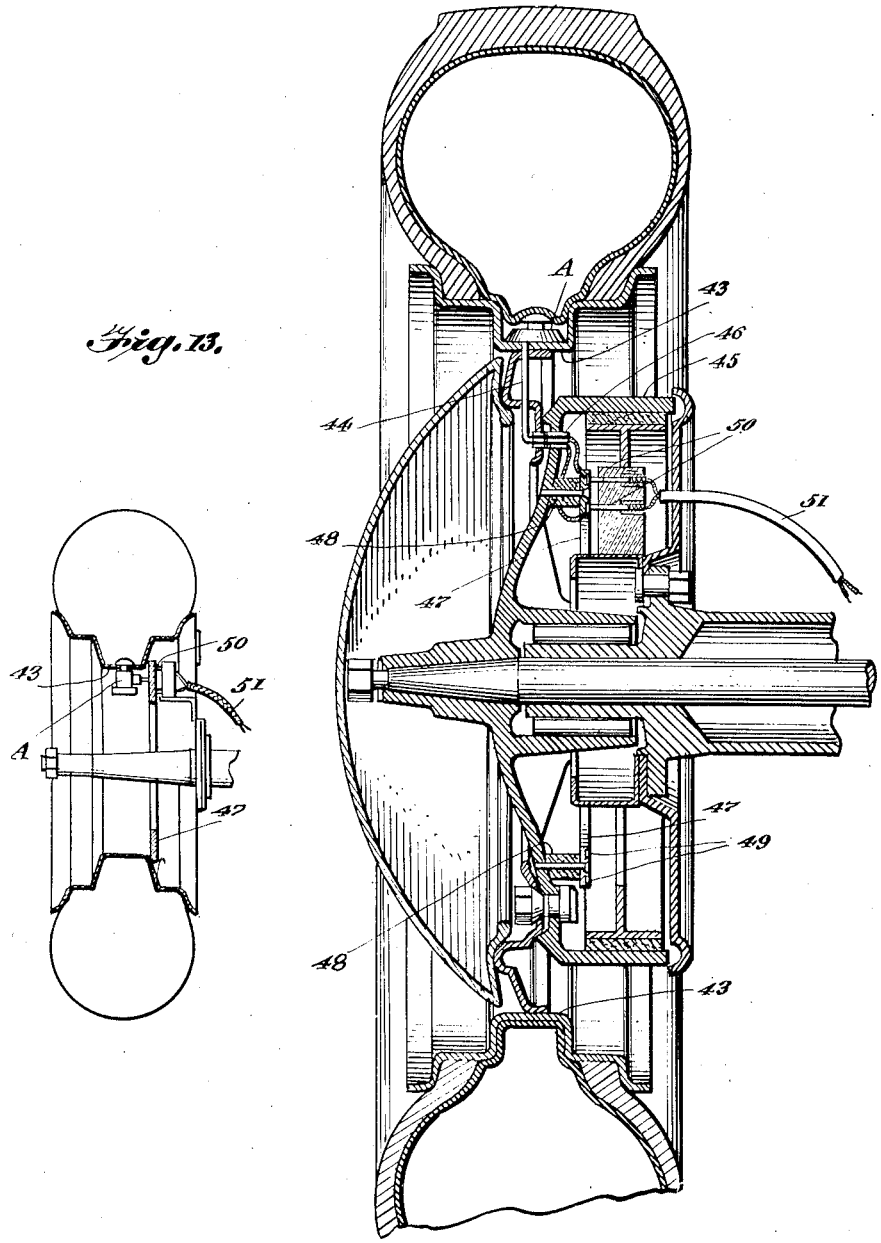

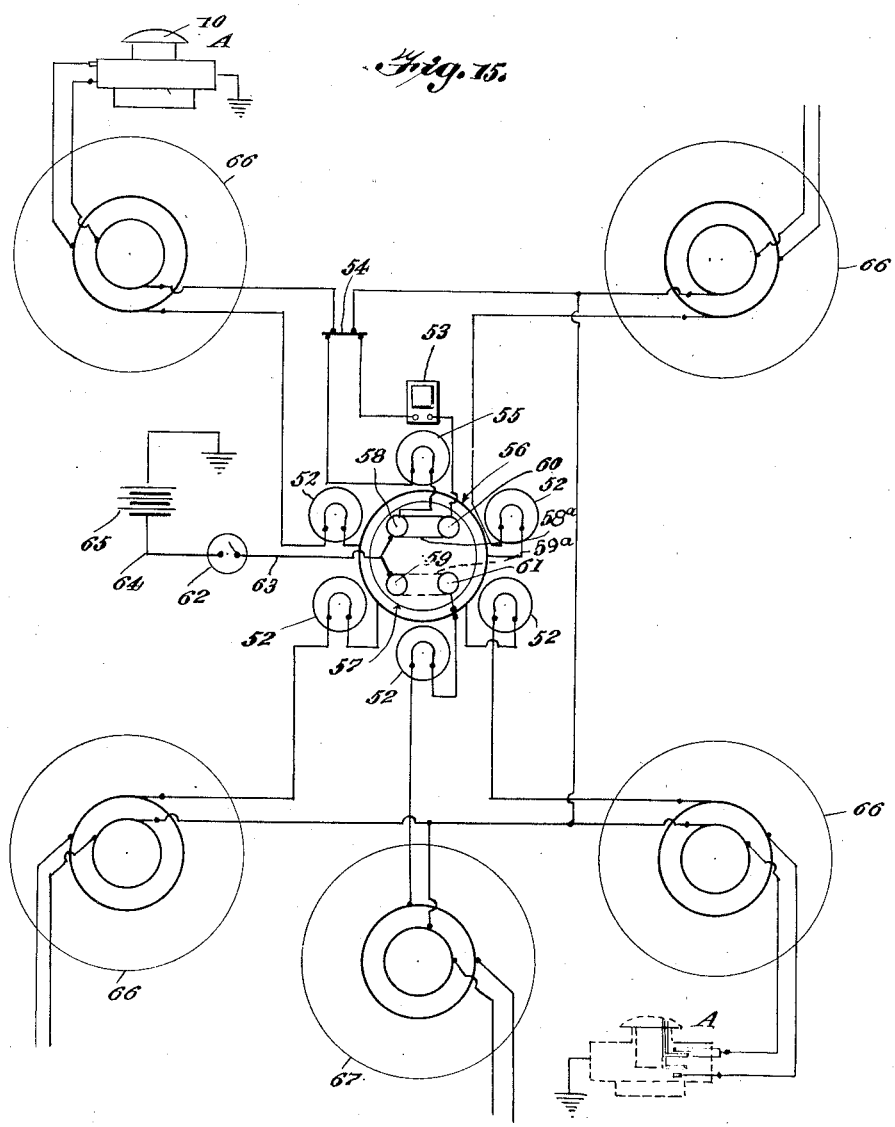

Patented July 15, 1941

2,249,426

UNITED STATES PATENT OFFICE 2,249,426

TIRE DEFLATION AND INFLATION INDICATOR

Edward C. Jones and Tom B. Seay, San Antonio, Tex.

Application June 5, 1940. Serial No. 339,018

2 Claims. (Cl. 2—58)

This invention relates to a tire deflation and inflation indicator.

An object of the invention is the construction of a novel and efficient device applied to the rim of the wheel of a motor vehicle, airplane or the like, for indicating the pressure at all times within the pneumatic tire of said wheel.

Another object is the provision of novel means for registering a set given pressure within the inner tube of a pneumatic tire; also the extreme maximum pressure desired to be used by the operator, and any other amount of air pressure that might be considered dangerous and hazardous for continued operation of the transportation being used by the operator.

A still further object of the invention relates to a novel device that can be attached to, or on or through the rim and in contact with the inner tube, the device being capable of registering variation of pressure in the inner tube, by operating, through an electric circuit, indicating or signaling means on a motor vehicle, airplane or the like.

With the foregoing and other objects in view, the invention comprises certain novel constructions, combinations, and arrangements of parts as will be hereinafter fully described, illustrated in the accompanying drawings, and more particularly pointed out in the appended claims.

In the drawings:

Figure 1 is a view in side elevation of the preferred form of the device constructed in accordance with the present invention.

Figure 2 is a vertical sectional view, taken on line 2—2, Fig. 1, and looking in the direction of the arrows.

Figure 3 is a view in side elevation of another embodiment of the present invention.

Figure 4 is a sectional view taken on line 4—4, Fig. 3, and looking in the direction of the arrows.

Figure 5 is a fragmentary plan view of the device shown in Figure 3.

Figure 6 is a bottom plan view of the device shown in Figures 3 and 4.

Figure 7 is a horizontal sectional view taken on line 7—7, Figure 4, and looking in the direction of the arrows.

Figure 8 is a fragmentary transverse sectional view of a flat rim, tire, etc., showing the device illustrated in Figures 1 and 2 applied thereto.

Figure 9 is a sectional view taken on line 9—9, Fig. 8, and looking in the direction of the arrows; the device being shown in full lines.

Figure 10 is a fragmentary transverse sectional view of a wheel, including a flat rim, showing the embodiment illustrated in Figure 2 applied thereto, with the exception that in this figure, the conduit is extending from one side of the device.

Figure 11 is a fragmentary transverse sectional view of a wheel with a drop center rim, showing the device of Fig. 3 thereon, with a rubber protector around the device.

Figure 12 is a diagram of an airplane pneumatic wheel with our invention applied thereto.

Figure 13 is a diagram of an airplane pneumatic wheel having a drop center rim to which is attached or applied our invention.

Figure 14 is a transverse fragmentary sectional view of a wheel showing the manner of applying, or the general hook-up, of our invention on said wheel.

Figure 15 is a wiring diagram of the system employing our devices.

Referring to the drawings, in which we have shown the preferred embodiments of our invention, A designates the preferred form, comprising an outer casing 1 which is threaded at 2, whereby the device can be threaded or screwed into a bushing 3, Figs 8 and 9.

The casing 1 is also threaded at its lower end 3 to receive a sealing cap 4. A slotted sleeve 5 is mounted within the casing 1 and rests at its lower end upon the adjustable bushing guide 6. This bushing guide 6 is threaded upon the lower end of the casing 1, Fig. 2. The sleeve 5 is provided with an elongated slot 7 into which extends the inner ends of horizontal pins 8, similar to pins 8 in Fig. 7. These pins 8 limit the vertical sliding movement of the plunger 9. The plunger 9 has an arcuate or rounded head 10 threaded thereon. Interposed between head 10 and slotted sleeve 5 is a coiled spring 11; this spring surrounds a portion of the plunger 9, as is clearly seen in Figure 2. The plunger 9 has a compartment or slot 12, in which is mounted contact holder 13. Contact holder 13 is mounted directly on adjusting screw 14. Screw 14 extending vertically through a portion of the plunger 9. The contact holder 13 includes a casing 15 in which is mounted hollow sliding contact wiper 16. Within the wiper point 16 is a coiled spring 17, which normally holds the wiper point 16 in contact with either the insulation filler 18 or the upper contact 19 or the lower contact 20, as the case may be. This insulation filler is mounted in the inner end of the housing 21, which housing is screw threaded at its inner end into the side of casing 1. A washer 22 is in housing 21, between the inner ends of contacts 19 and 20 and the housing. A suitable cable 23 is connected to one end of the contact 20 and this cable 23 is electrically connected to a green light of the system. Cable 24 is connected at one end to an end of contact 19, and this cable is connected to a red light and a buzzer, for signaling when the pressure in the inner tube is diminishing. When the pressure in the inner tube is correct the current will flow through contact 20 and cable 23 to the green light, indicating that all is correct. This signaling is accomplished by the pressure in the inner tube forcing head 10 downward, causing the plunger 9 to hold the contact holder in such position as will cause the contact wiper point 16 to engage an end of the contact 20, leading to the green light. When the pressure in the inner tube or tire decreases, spring 11 will force upwardly or inwardly head 10, resulting in the sliding contact wiper point moving across the insulation filler to engagement with the comparatively broad or wide contact 19; this contact has a greater exposed surface than contact 20 because it is desirable to have the red light burning longer, as the pressure is lowered in the tube, to give the operator of the vehicle full warning, through the hook-up of the red light and the buzzer.

By adjusting the bushing guide 6, tension on coil spring 11 will be varied; also by adjusting screw 14 an accurate control can be had on positioning of the wiper point 16 with reference to the contacts 19 and 20.

In the embodiment shown in Figures 3 and 4 the head 10 is the same as in the embodiment illustrated in Figures 1 and 2. The head 10 (Fig. 4) is mounted upon a plunger unit 25, which is vertically slotted at 26, in the same general manner as is plunger 9. In slot 26 are the inner ends of pins 8a; these pins 8a are mounted in a horizontal position upon the body or casing 25', which casing is similar in function to casing 1. Within the plunger unit 25 is a coil spring 27, which exerts upward or outward pressure at all times upon the head 10. A spring-seat plug 28 is threaded into the bottom of casing 25' and the lower end of spring 27 bears against said plug 28. By screwing inwardly or outwardly plug 28, the tension of the spring 27 can be controlled, to suit the operator. A spring 29 is fastened in the head; this spring 29 is of a double L-shape construction, to give stability, and to afford an outwardly extending portion 30 for engaging with the horizontal contact terminal 31 (Fig. 4). Contact terminal 31 is partly embedded in a filler 32, which filler 32 is formed of any suitable non-conducting material. A second filler 33 is positioned vertically in casing 25' and supports a thimble-like terminal 34. Adjustably mounted in terminal 34 is a contact screw 35. By rotating screw 35 the inner end thereof can be moved towards or away from the portion 30 of L-shape spring 29. The wire 36 is adapted to be connected to the green light of the system, and the wire 37 is adapted to be connected to the danger or red light and the buzzer of the system. When the inner tube is suitably expanded, the portion 30 will be engaging the inner end of screw 35, thereby completing the circuit to the green light. However, upon the inner tube being deflated for any reason the portion 30 engages the contact terminal 31 which results in the red light burning and the buzzer operating, to indicate to the operator that the inner tube is being deflated, or has become entirely deflated, whereupon the operator will be fully warned.

In Figures 8 and 9 the preferred device is shown screwed into the bushing 3, which bushing is also screwed into the rim 38.

In the embodiment shown in Figure 10, the device has the conduit 39 entering its side, as well as the side of the holder 40; holder 40 is provided with a cap 41. Holder 40 is screwed into flat rim 41.

In Figure 11 we have shown a rubber protector 42 around the device, which protector rests on the inside of the drop center rim 43. The conduit 44 extends up through rim 43 and connects to the device through the bottom of the casing thereof.

Referring to Figure 14: The device A is mounted on the drop rim 43 and the conduit 44 passes through the hub 45 at 46. The wires of the conduit 44 are connected to an insulated ring 47 which is suitably supported at 48 upon the inner face of hub 45. In this insulating ring 47 are metallic collecting rings 49. Brushes 50 contact at their outer ends with these collecting rings 49. Leading from the inner ends of brushes 50 are the wires of the conduit 51.

In Figures 12 and 13 the same general hook-up is applied as shown and described in general with reference to the disclosure of Figure 14.

Referring to Figure 15: There are shown preferably five green lights 52; a buzzer 53, a bus bar 54, a red danger light 55, all suitably electrically connected. 56 is a lamp base circuit. 57 is a light and buzzer switch. 58, 59, 60 and 61 are terminals of control switch 57. Dotted lines 59ᵃ indicate electrical connections between terminals of switch at 57 and 61, Fig. 15, when switch knob is pulled out. The switch bar 59ᵃ is shown connecting terminals 58 and 60, and dotted lines 59ᵃ indicate its other position when pulled out, completing circuit through terminals 57 and 61. A master switch 62 is electrically connected by wire 63 to the terminals 58, 59, 60 and 61. By means of a wire 64 a master switch 62 is electrically connected to battery 65. In this diagram, 66 designates the four wheels, and 67 is the spare wheel (or spare tire). At A in this diagram the devices are shown, electrically connected to two of the wheels 66. The specific hook-up of each device in a wheel has been described in connection with the description of Figure 14.

It is to be understood that when the pressure in the inner tube of all of the pneumatic tires is proper, then the green lights 52 will continue to burn or glow. However, when, for any reason, the pressure is lowered in the inner tubes, then the green lights assisted with the tubes of reduced pressure will go out, and the red light 55, as well as buzzer 53 will operate, to warn the operator. This is true whether one of the inner tubes (wheel) is affected, or if all are affected at the same time.

In Figure 3, the dotted line 68 indicates how the conduit may be connected to the side of the casing 25, instead of being connected to its bottom as is shown in full lines in this figure.

In the embodiments shown particularly in Figures 2 and 4 there are several common features, including the casings 1 and 25', the arcuate head 10, the slotted plunger unit 9 and 25, carrying head 10, which unit is outwardly pushed or held by a coil spring in both instances; in each embodiment there is a contacting unit extending laterally from the plunger unit, adapted to engage a plurality of contacts carried at one side of the casing, etc.

While we have described the preferred embodiments of our invention and illustrated same in the accompanying drawings, certain changes or alterations may appear to one skilled in the art to which this invention relates during the extensive manufacture of same, and we, therefore, reserve the right to make such changes or alterations as shall fairly fall within the scope of the appended claims.

What we claim is:

1. In a device of the class described, the combination of a casing, an adjustable bushing in one end of said casing, a slotted sleeve within said casing and resting on said bushing, a sliding plunger within said casing and bushing, said sliding plunger provided with a slot registering with the slot of said sleeve, pins on said casing and extending into the slots of said plunger and said sleeve, a head on the upper end of said plunger, a coil spring resting at one end on one end of said sleeve, and pressing at its other end against said head, a contact holder in said plunger, an adjusting screw extending through a portion of said plunger and supporting said contact holder, said contact holder provided with a spring-pressed contact wiper point, said casing provided with a housing on its side, an insulating filler in said housing, a pair of contacts in said filler and having their inner ends exposed to the inside of said casing, and said contact wiper point being adapted to engage the inner ends of said contacts.

2. In a device of the class described, the combination of a casing provided with a threaded portion near its upper end, said casing being provided with a sealing cap on its lower end, a bushing guide screwed into the lower end of said casing, a slotted sleeve within the casing and resting upon the said bushing guide, a plunger within said sleeve, said plunger provided with an elongated slot registering with slot of said sleeve, pins on said casing and extending into said slots, a coil spring around said plunger and resting at its inner end against one end of said sleeve, a head on said plunger and against one end of said coil spring, said plunger provided with a compartment, a screw extending through a portion of the lower end of said plunger, and into said compartment, a contact holder mounted on said screw within said compartment, said contact holder provided with a hollow portion, a hollow contact wiper point within said hollow portion, a spring within said wiper point, a housing on one side of said casing, a non-conducting filler within said housing, terminals of varying sizes embeded in said filler, and said wiper point being adapted to engage either one of said terminals, depending upon the movement of said plunger within said casing, substantially as shown and described.

EDWARD C. JONES,
TOM B. SEAY.